United States Patent
Wang et al.

(10) Patent No.: US 11,659,263 B2
(45) Date of Patent: May 23, 2023

(54) SPLIT LENS AND CAMERA MODULE AND ELECTRONIC APPARATUS

(71) Applicant: NINGBO SUNNY OPOTECH CO., LTD., Zhejiang (CN)

(72) Inventors: Mingzhu Wang, Ningbo (CN); Shoujie Wang, Ningbo (CN); Nan Guo, Ningbo (CN); Liang Ding, Ningbo (CN); Bojie Zhao, Ningbo (CN); Feifan Chen, Ningbo (CN); Chunmei Liu, Ningbo (CN); Qimin Mei, Ningbo (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 679 days.

(21) Appl. No.: 16/497,433

(22) PCT Filed: Mar. 22, 2018

(86) PCT No.: PCT/CN2018/079953
§ 371 (c)(1),
(2) Date: Jun. 25, 2020

(87) PCT Pub. No.: WO2018/171656
PCT Pub. Date: Sep. 27, 2018

(65) Prior Publication Data
US 2022/0224808 A1    Jul. 14, 2022

(30) Foreign Application Priority Data

Mar. 24, 2017  (CN) .......................... 201710182535.9
Mar. 24, 2017  (CN) .......................... 201720299172.2

(51) Int. Cl.
*H04N 5/225* (2006.01)
*G03B 13/36* (2021.01)

(52) U.S. Cl.
CPC .......... *H04N 5/2254* (2013.01); *G03B 13/36* (2013.01); *H04N 5/2257* (2013.01)

(58) Field of Classification Search
CPC .... H04N 5/2254; H04N 5/2257; G03B 13/36; G03B 17/14; G03B 19/07; G02B 5/003;
(Continued)

(56) References Cited

U.S. PATENT DOCUMENTS

| 2009/0185291 A1 | 7/2009 | Tsuchiya et al. |
| 2011/0058265 A1 | 3/2011 | Chang et al. |

(Continued)

FOREIGN PATENT DOCUMENTS

| CN | 200993689 | 12/2007 |
| CN | 103874950 | 6/2014 |

(Continued)

OTHER PUBLICATIONS

English translation of TW-201734534-A (Year: 2017).*
(Continued)

*Primary Examiner* — Shahbaz Nazrul
(74) *Attorney, Agent, or Firm* — Wenderoth, Lind & Ponack, L.L.P.

(57) ABSTRACT

A split lens includes a first lens group including a first set of lenses, a second lens group including a second set of lenses, and at least one light shielding element. The light shielding element is disposed between the lens at the bottom position of the first lens group and the lens at the top position of the second lens group, such that a predetermined light path is formed between the first lens group and the second lens group, thereby conforming to the structure of the split lens.

27 Claims, 10 Drawing Sheets

(58) Field of Classification Search
CPC ... G02B 13/001; G02B 7/021; G02B 27/0018
See application file for complete search history.

(56) References Cited

U.S. PATENT DOCUMENTS

| | | | |
|---|---|---|---|
| 2012/0218649 A1* | 8/2012 | Konishi | G02B 7/08 |
| | | | 156/305 |
| 2013/0028587 A1* | 1/2013 | Kaneko | G03F 7/031 |
| | | | 252/586 |
| 2014/0118852 A1 | 5/2014 | Komiyama et al. | |
| 2014/0218813 A1 | 8/2014 | Araki et al. | |
| 2015/0301303 A1 | 10/2015 | Kim et al. | |
| 2016/0178874 A1 | 6/2016 | Kim | |
| 2016/0223829 A1 | 8/2016 | Nagayama | |
| 2017/0176649 A1 | 6/2017 | Chang | |
| 2017/0219745 A1 | 8/2017 | Chou | |

FOREIGN PATENT DOCUMENTS

| | | | |
|---|---|---|---|
| CN | 105549173 | 5/2016 | |
| CN | 205333947 | 6/2016 | |
| CN | 205594216 | 9/2016 | |
| CN | 207263999 | 4/2018 | |
| EP | 2 498 112 | 9/2012 | |
| EP | 3 410 169 | 12/2018 | |
| EP | 3605177 | 2/2020 | |
| JP | 09-279109 | 10/1997 | |
| JP | 11-341365 | 12/1999 | |
| JP | 2007-010866 | 1/2007 | |
| JP | 2008-003603 | 1/2008 | |
| JP | 2009-175331 | 8/2009 | |
| JP | 2010-191345 | 9/2010 | |
| JP | 2014-164239 | 9/2014 | |
| JP | 2014232147 A | 12/2014 | |
| JP | 2015-094803 | 5/2015 | |
| JP | 2015-118111 | 6/2015 | |
| JP | 2019-552211 | 4/2020 | |
| KP | 200425948 Y1 | 9/2006 | |
| KP | 1020140076761 | 6/2014 | |
| KP | 1020140076761 A | 6/2014 | |
| KP | 1020140146980 A | 12/2014 | |
| TW | M523103 | 6/2016 | |
| TW | 201734534 A * | 10/2017 | ............ G02B 7/021 |
| WO | 2011/055503 | 5/2011 | |
| WO | WO2011122357 | 10/2011 | |
| WO | 2014/156954 | 10/2014 | |
| WO | 2014/175058 | 10/2014 | |

OTHER PUBLICATIONS

International Search Report dated Jun. 15, 2018, in International (PCT) Application No. PCT/CN2018/079953, with English translation.

Communication pursuant to Article 94(3) EPC dated Jul. 21, 2022, in corresponding European Patent Application No. 18771160.1.

* cited by examiner

SPLIT LENS AND CAMERA MODULE AND ELECTRONIC APPARATUS

BACKGROUND OF THE PRESENT INVENTION

Field of Invention

The present invention relates to a camera lens arrangement, and more particularly to a split lens being incorporated in a camera module of a smart device.

Description of Related Arts

The performance of a camera product directly relates to a quality of an optical lens configuration. In other words, making a good quality optical lens is a major factor for manufacturing a high performance of the camera product in the camera industry. In the field of camera photography, optical lens research and development is one of the most important industry trends for the leading camera manufacturers. With the popularity of smart mobile devices, the design and development of optical lenses have encountered more challenges.

Smart mobile devices, especially smartphones, Internet-enabled tablets, laptops, service terminals, and portable identification devices, become daily necessary products which are incorporated with a camera module. The camera module is directly assembled into the such devices to form an image sensing device. It is worth mentioning that the performance of the camera module is as good as the performance of a professional camera device. Therefore, the requirement and expectation of the camera module is getting higher and higher.

Obviously, the most effective way is to improve from the lens of the camera module, wherein the major component that affects the resolution and quality of the camera module is a lens thereof. Accordingly, a conventional camera generally comprises a plurality of optical lenses sequentially stacked with each other and mounted in a lens barrel. When two or more lens barrels are assembled together, a complete optical module is formed via an optical transmission relationship between every two of the optical lenses in the lens barrels. However, there are some deficients or tolerances during the assembling operation of the optical lenses due to the eccentricity and tilting of the optical lenses, which will result in lower the resolution of the optical module. In addition to the tolerance between every two of the optical lenses in each lens barrel, there are also some tolerances between every two of the lens barrels during the assembling operation of the optical module. It is difficult to fix or correct such tolerances after the assembling operation of the optical module is completed. Furthermore, it is a waste of material due to the high failure rate and low production rate of the optical module.

A lens spacer must be added in each lens barrel in order to enhance the design and performance of the optical system. Accordingly, the lens spacer affects not only the focal length, intercept and discrimination rate of the optical ability, but also the resolution of the optical module. Furthermore, the structural configuration of the lens spacer also affects by the diameter difference between two corresponding optical lenses and their aperture sizes. The existing manufacturing process of the optical module requires good design and simulation of the lens spacer and precise assembling step of the lens spacer. In other words, the lens spacer must provide a uniform optical spacing, an effective optical aperture, and precise optical axial alignment to guarantee the quality of the optical module. In order to ensure the imaging quality of the optical module, the optical module must provide an excellent light shielding environment thereof to prevent any external light entering into the optical module so as to minimize any external stray light.

Furthermore, the increasing number of optical lenses is adapted for the high pixel camera modules. In other words, the overall height of the camera module will be increased by the increasing number of optical lenses. On the other hand, the camera module is designed and developed in a thinner and compact manner. Due to the highly development of the camera module technology, an improvement of each component in the camera module is crucial. For example, the lens spacer is indispensable in the conventional camera module, and will occupies a certain installation space in the camera module. Accordingly, the lens spacer is made of soft material and is sandwiched between two optical lenses. The lens spacer is difficult to mount at the lens barrel in order to fix and retain the position of the lens spacer.

It is to the provision of a camera module to enhance the performance of the camera module, to improve the yield and production efficiency of the camera module, and to minimize the production costs of the camera module.

SUMMARY OF THE PRESENT INVENTION

An advantageous of the invention is to provide a lens split, which comprises a plurality of lens groups and a light shielding element disposed between two of the lens groups to block the light into the lens split through the gap between two lens groups and to form a predetermined light path of the lens split.

Another advantage of the invention is to provide a lens split, wherein the light shielding element is configured to match with the structural design of the split lens, so as to replace the incompatibility of the conventional spacer in the split lens.

Another advantage of the invention is to provide a lens split, wherein the light shielding element is attached to a surface of the lens group to reduce the overall height of the lens groups and to prevent the deformation of the conventional spacer caused by the small and unstable bearing surface.

Another advantage of the invention is to provide a lens split, which is configured to dispose the light shielding element between two lens groups for improving the performance of the split lens and reducing the designing cost of the split lens. Thus, the configuration of the lens split is able to reduce the assembling difficulty level and to minimize the production cost of the lens split.

Another advantage of the invention is to provide a lens split, wherein, by simplifying the assembling of the lens groups and using the active alignment process, the performance of the split lens can be further enhanced when applying to the camera module.

Another advantage of the invention is to provide a lens split, wherein, by simplifying the assembling and design of the light shielding element between two lenses, the split lens is able to achieve good integrity and consistency and is beneficial to optical axis calibration.

Another advantage of the invention is to provide a lens split, wherein each of two lens groups has a retention portion being coupled with each other in different connection configurations, so as to assemble the two lens groups together in a stable and reliable manner.

Another advantage of the invention is to provide a lens split, wherein the lens and the light shielding element are mounted to the lens group to minimize assembling tolerance of the lens to the lens barrel, to enhance the production efficiency and to minimize the material waste during the assembling process.

Another advantage of the invention is to provide a lens split, wherein when the two lens groups are installed, the retention portions thereof are configured to minimize the assembling tolerance so as to ensure the overall consistency of the split lens after it is assembled.

Another advantage of the invention is to provide a lens split, which can connect two lens groups reliably, minimize the assembling tolerance between the lens barrels, and greatly improve the production efficiency.

Another advantage of the invention is to provide a lens split, wherein the retention portions of the lens groups are suitable for various connection configurations, such that the retention portions can be selected and used for connecting the lens groups in different lens configurations.

Another advantage of the invention is to provide a lens split, which can enhance the quality of the lens group to ensure optical spacing, effective aperture, and optical axis uniformity.

Another advantage of the invention is to provide a lens split, which has high design flexibility to fit the needs of the lens group, so as to ensure the quality of the camera module.

Another advantage of the invention is to provide a lens split, which meets the optical performance requirements for different lens configurations. The light shielding element and the retention portion are incorporated to make the optical relationship between the two lens groups more stable and reliable.

Another advantage of the invention is to provide a lens split, which can enhance the alignment assembly between the lenses to form a compact structure so as to form an integrated split lens.

Another advantage of the invention is to provide a lens split, wherein the light shielding element can be partially or entirely coated on the lens to simplify the assembling process of the lens group.

Another advantage of the invention is to provide a lens split, wherein the spacing element and the light shielding element are selectively used for providing a diversified solution for different lens design requirements of the lens group.

According to the present invention, the foregoing and other objects and advantages are attained by a split lens comprising: at least a first lens group comprising at least a first lens set and a first lens barrel, wherein the first lens set is mounted in the first lens barrel; at least a second lens group comprising at least a second lens set and a second lens barrel, wherein the second lens set is mounted in the second lens barrel; and at least a light shielding element disposed between a bottom surface of the first lens set and a top surface of the second lens set to form a predetermined light path between the first lens group and the second lens group when the first lens group and the second lens group are stably assembled together.

In one embodiment, one of the light shielding elements is disposed on the top surface of the lens at an upper position of the second lens set.

In one embodiment, one of the light shielding elements is disposed on the top surface of the lens at a bottom position of the first lens set.

In one embodiment, three of the light shielding elements of the split lens are respectively disposed on the bottom surfaces of three lenses of the first group set, and the two of the light shielding elements are respectively disposed on the top surfaces of two lenses of the second lens set.

In one embodiment, the light shielding element is disposed between two adjacent lenses which are located at the first lens group and the second lens group respectively in the split lens.

In one embodiment, at least one of the light shielding elements is disposed between two adjacent lenses which are located at the first lens group and the second lens group respectively in the split lens.

In one embodiment, the light shielding element of the split lens is disposed on the bottom surface of the lens at the upper position. In other words, in response to two adjacent lenses of the first lens set and the second lens set as an upper lens and a bottom lens respectively, the light shielding element is disposed on a bottom surface of the upper lens at an upper position.

In one embodiment, the light shielding element of the split lens is disposed on the top surface of the lens at the bottom position. In other words, in response to two adjacent lenses of the first lens set and the second lens set as an upper lens and a bottom lens respectively, the light shielding element is disposed on a top surface of the bottom lens.

In one embodiment, the split lens further comprises at least one spacing element disposed between the two lenses of at least one of the first lens set and the second lens set to fulfill the requirements for the lens in an optical design.

In one embodiment, the first lens group and the second lens group of the split lens are assembled through an active calibration.

In one embodiment, the first lens barrel further comprises a first retention portion, and the second lens barrel further comprises a second retention portion, wherein the first retention portion and the second retention portion are connected with each other, such that the first lens barrel and the second lens barrel are assembled to form an integrated lens configuration.

In one embodiment, a diameter of the bottom end portion of the first lens barrel is smaller than a diameter of the top end portion of the second lens barrel, such that the first retention portion of the first lens barrel is configured to fit into the second retention portion of the second lens barrel so as to stably couple the first lens barrel with the second lens barrel.

In one embodiment, the first retention portion is defined at the bottom end portion of the first lens barrel, the second retention portion is defined at the top end portion of the second lens barrel, wherein the first retention portion and the second retention portion are connected with each other via the connecting element so as to securely couple the first lens barrel and the second lens barrel with each other.

In one embodiment, the first retention portion is defined at the bottom end portion of the first lens barrel having an increased diameter, wherein the bottom lateral side of the first retention portion is adhesively affixed to the top side of the second retention portion.

In one embodiment, the outer side of the first retention portion is adhesively affixed to the top side of the second retention portion.

In one embodiment, the second lens barrel further has a retention groove formed at the top side of the second lens barrel corresponding to the first retention portion of the first lens barrel, wherein the connecting element is filled in the retention groove to couple the first retention portion and the second retention portion with each other.

In one embodiment, the first retention portion is protruded from an outer lateral side of the first lens barrel, wherein the second retention portion is formed at the top end portion of the second lens barrel. The first retention portion and the second retention portion are connected with each other at a position that the bottom end portion of the first lens barrel is extended into the second retention portion for connecting the first lens barrel and the second lens barrel with each other so as to form an integrated lens configuration.

In one embodiment, the bottom side of the first retention portion is bonded to a top lateral side of the second retention portion by adhesive.

In one embodiment, the retention groove is formed at the top side of the second retention portion for accommodating at least one connecting element to bond the second retention portion with the first retention portion.

In one embodiment, the light shielding element of the split lens is a coating layer.

In one embodiment, the light shielding element of the split lens is a black rubber layer.

In one embodiment, the first lens set of the split lens is constructed to have three lenses, and the second lens set is constructed to have three lenses.

In one embodiment, the light shielding element of the split lens is formed by one of the methods of coating, spraying, and silk screen printing.

In one embodiment, the lens at the bottom position of the first lens group is bonded to the inner surface of the first lens barrel by at least one connecting element via adhesive.

In accordance with another aspect of the invention, the present invention comprises a camera module incorporating with the split lens to form an electronic apparatus.

DETAILED DESCRIPTION OF THE PREFERRED EMBODIMENT

Figure 1:
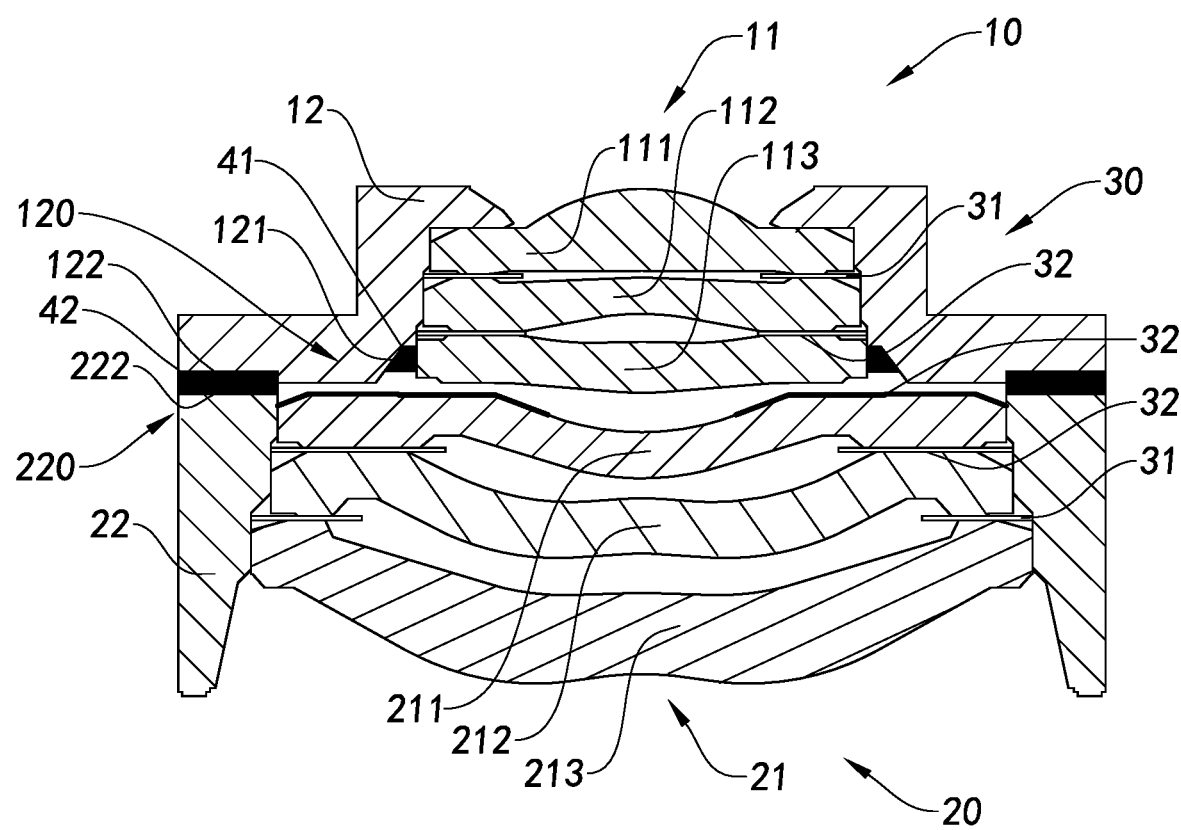
FIG. 1 is a sectional view of a split lens according to a first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", "vertical", "horizontal", "top", "bottom", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

A conventional lens structure, especially being used in camera module, is commonly configured in a stable and uniform manner by stacking a plurality of lenses in a lens barrel. When there are not many lenses, such as two or three lenses, the assembling tolerance of the lens structure is relatively small. For the camera module with high pixel and high image quality, the number of lenses will be increased. In other words, the assembling tolerance of the lens structure is relatively high. Therefore, the conventional lens structure is not suitable for and not acceptable for the high performance camera module. Accordingly, the present invention provides a split lens which comprises a plurality of lens groups being assembled together, wherein each of the lens groups comprises a plurality of lenses assembled together. Therefore, each lens group is constructed to have less number of lenses to minimize the assembling tolerance of the split lens. On the other hand, the total number of lenses will be increased via the assembling of the lens groups. As a result, the split lens provides a higher pixel with less assembling tolerance by using Active Alignment (AA) method during the assembling process to assemble the multi-lens groups. The assembling tolerance between the lens groups will also be reduced to provide a better optical consistency of the split lens.

The present invention provides a split lens which comprises a plurality of lens groups, wherein each of the lens groups comprises a plurality of lenses. Accordingly, the lenses are assembled to form each lens group, wherein the lens groups are assembled together to form the split lens. During the assembling operation of each of the lens groups of the split lens, the relative positions of the lens groups are adjustable to minimize the overall assembling tolerance of the split lens so as to incorporate with the camera module with high resolution. Furthermore, the present invention further provides a light shielding element having an annular shape disposed between every two of the lens groups for blocking light entering through a gap between two lens groups so as to form a light path within the lens groups. The light shielding element is configured to incorporate with the split lens to adapt for the lens groups, so as to solve the existing problems of the lens spacer of difficult installation, instability and deformation. Furthermore, the light shielding element can be disposed above the lens at the bottom position of the lens group. Alternatively, the light shielding element can be disposed below the lens at the upper portion of the lens group. Furthermore, the light shielding element can be attached to the lens by coating, spraying silk screening, etc, such as applying black glue. For example, the light shielding element can be applied at a bottom surface of the lens at the bottom position of the upper lens group and/or at a top surface of the lens at the upper position of the bottom lens group, wherein the light shielding element is arranged for blocking stray light to the lens groups so as to form a predetermined light path of the lens groups. The light shielding element cooperates with the structure of the split lens to achieve the assembly of the independent and individual lens groups, and to prevent any interference of the side stray light of the entire split lens.

For easy understanding, the description and drawings disclose a simplest structure of the split lens which is constructed to have two lens groups as an example, wherein the two lens groups are a first lens group and a second lens group. It should be appreciated that the split lens may be constructed to have more than two lens groups, such as three or more, and it should not be limited in the present invention.

Accordingly, the split lens of the present invention comprises a first lens group 10, a second lens group 20, and at least a light shielding assembly 30. The first lens group 10 comprises a first lens set 11 and a first lens barrel 12, while the second lens group 20 comprises a second lens group 21 and a second lens barrel 22. The first lens set 11 is mounted in the first lens barrel 12. The second lens set 21 is mounted in the second lens barrel 22. It is worth mentioning that the light shielding assembly 30 comprises a light blocking element 32 disposed between the first lens group 10 and the second lens group 20 to light-shield a connection between the first lens group 10 and the second lens group 20 for blocking the external light entering into the split lens and to form a predetermined light path between the first lens group 10 and the second lens group 20. The first lens group 10 and the second lens group 20 are assembled together to form the split lens at a position that the first lens group 10 is located above the second lens group 20, such that the first lens group 10 is embodied as an upper lens group while the second lens group 20 is embodied as a bottom lens group. Preferably, the first lens group 10 and the second lens group 20 are assembled to form the split lens with a stepping shape. It is appreciated that the first lens group 10 and the second lens group 20 are assembled to form a camera module. As shown in FIG. 1, the first lens set 11 of the first lens group 10 further comprises a first lens 111, a second lens 112, and a third lens 113. The second lens set 21 of the second lens group 20 further comprises a fourth lens 211, a fifth lens 212, and a sixth lens 213. It should be understood that, in the preferred embodiment, the number of lenses in the first lens set 11 and the second lens set 21 should not be limited in the present invention, wherein the number of lenses can be varied according to the requirements of different camera modules. For easy understanding, the lenses in the split lens are named as the first lens 111, the second lens 112 and the third lens 113 mounted in the first lens barrel 12, wherein the first lens 111 and the third lens 113 are located at the upper and bottom positions respectively while the second lens 112 is located between the first lens 111 and the third lens 113. The fourth lens 211, the fifth lens 212 and the sixth lens 213 are mounted in the second lens barrel 22, wherein the fourth lens 211 and the sixth lens 213 are located at the upper and bottom positions respectively while the fifth lens 212 is located between the fourth lens 211 and the sixth lens 213.

It can be understood that, in the embodiment of the present invention, the split lens is constructed with two lens groups as an example. In other modified embodiments, the split lens may also include more than two lens groups. The light shielding element is disposed between two adjacent lens groups to prevent side light from entering the split lens.

Furthermore, according to the preferred embodiment, the light shielding element 32 is disposed at a top surface of the lens at an upper position of the bottom lens set. Particularly, the light shielding element 32, having an annular shape, is attached to the top surface of the fourth lens 211 of the second lens group 20, such that a peripheral edge portion of the fourth lens 211 is covered by the light shielding element 32 to form a light blocking portion so as to form a predetermined light path at a center portion of the fourth lens 211. Therefore, the light from the first lens group 10 can pass through the center portion of the fourth lens 211 along the light path thereof. It is worth mentioning that since the light shielding element 32 is disposed at a position between the first lens group 10 and the second lens group 20, the light shielding element 32 is able to block the light entering into a connection between the first lens group 10 and the second lens group 20 so as to prevent any light entering to the light path in the split lens. Preferably, the light shielding element 32 can be an adhesive layer, such as an adhesive layer formed by coating, spraying, silk screening, or the like, or an adhesive layer formed by pasting manner. Preferably, the light shielding element 32 can be a black rubber adhesive layer, such as a ring-shaped black rubber adhesive film.

It is worth mentioning that the split lens further comprises an optical component, such as a spacer, disposed between the first lens group 10 and the second lens group 20 of the split lens, such that the light path is formed between the first lens between the first lens group 10 and the second lens group 20 to prevent stray light. In other words, at least one optical component is formed between the lens at the bottom position (i.e. the third lens 113) of the first lens group 10 and the lens at the upper position (i.e. the fourth lens 211) of the second lens group 20. However, the conventional spacer mounting method is to sandwich the spacer between two adjacent lenses, and the material is light and thin. Therefore, when the optical component is used as the conventional spacer, the bottom side of the first lens group 10 cannot provide any suitable mounting space for the spacer while the second lens group 20 also cannot provide any suitable mounting space for the spacer. In one embodiment as an example, the spacer can only coupled at the top surface of the fourth lens 211, wherein a bottom side of the spacer is supported by the fourth lens 211 while a top side of the spacer cannot be fixed or retained, such that the conventional spacer is not fit for the split lens of the present invention. According to the preferred embodiment, the light shielding element 32 is attached to the lens at the bottom position (the third lens 113) of the first lens group 10 or is attached to the lens at the upper position (the fourth lens 211) of the second lens group 20. Then, the predetermined light path is formed between the first lens group 10 and the second lens group 20 without incorporating with any conventional spacer in a clamping manner.

The lens at the bottom position of the first lens group 10 refers to the third lens 113. The lenses can be mounted in the first lens barrel 12 by means of interference fit. Alternatively, the lenses can be mounted in the first lens barrel 12 by laser welding, ultrasonic welding or the like. In one embodiment, adhesive is applied at a peripheral edge of the lens to reinforce the position thereof. Particularly, the first lens barrel 12 further has a reinforcing groove formed at an inner side of a bottom portion thereof, wherein a bonding element 41, such as adhesive, is received in the reinforcing groove to retain and fix the third lens 113 at the bottom portion of the first lens barrel 12. The bonding element can be UV glue, thermosetting glue, UV thermosetting glue, and etc.

Preferably, in some embodiments, the reinforcing groove is symmetrically distributed between the inner side surface of the first lens barrel 12 and the third lens 113 to retain the third lens 113 in position by evenly distributing a holding force thereto so as to prevent any uneven deformation of the bonding element 41. It is worth mentioning that the bonding element 41 may be thermally expanded its size, as an example, to create the uneven holding force to dislocate the third lens 113.

The reinforcing groove can be configured in different shapes according to requirements, such as a wedge shape, a triangle shape, a trapezoid shape, a rectangular shape and the like. Two or more reinforcing grooves can be configured to space apart or to form a continuous connecting groove. In other words, the reinforcing grooves can form an integral annular groove that the integral annular groove can be configured to have different shapes and different cross sections.

Preferably, a depth of the reinforcing groove is smaller than a thickness of the peripheral edge of the third lens 113 to prevent any gap formed between the reinforcing groove and the top edge of the third lens 113, such that the bonding element 41 can be filled in the gap into the interior of the reinforcing groove. Therefore, the bonding element 41 will not leak at the top edge of the third lens 113.

In one embodiment and drawings thereof of the present invention, each of the reinforcing grooves has a trapezoidal cross section, wherein there are four reinforcing grooves symmetrically formed at the inner side of the lens barrel. In other embodiments of the present invention, the reinforcing groove and the corresponding bonding element 41 can be configured to have other shapes and other quantities, such as three, five, and five or above. It should not be limited in the present invention.

According to the preferred embodiment of the present invention, the light shielding unit further comprises at least a spacing element 31. In one embodiment, the spacing element 31 is a spacer. It is worth mentioning that the spacing element 31 has an annular shape and is made of opaque material. In other words, the spacing element 31 and the light shielding element 32 constitute a spacer assembly respectively disposed between adjacent lenses to form a predetermined light path for the split lens.

The light shielding element 32 is coated on the surface of the lens, wherein since the light shielding element 32 is made of opaque material, the light shielding element 32 will block the light from passing through the surface portion of the lens covered by the light shielding element 32. In other words, the light shielding elements 32 are respectively disposed at the spaces between the lenses for ensuring optical spacing, effective optical aperture, and optical axis consistency between the lenses.

Particularly, in one embodiment, one of the spacing elements 31 is mounted between the first lens 111 and the second lens 112. One of the spacing elements 31 is mounted between the second lens 112 and the third lens 113. The light shielding element 32 is mounted between third lens 113 and the fourth lens 211. One of the spacing elements 31 is mounted between the fourth lens 211 and the fifth lens 212. One of the spacing elements 31 is mounted between the fifth lens 212 and the sixth lens 213. Depending on the optical design and configuration of the lens, the distance between the lenses has different requirements. In one embodiment, the distance between the first lens 111 and the second lens 112 is separated by the spacing element 31, wherein the distance between the first lens 111 and the second lens 112 can be effectively fixed. Likewise, the gap between the fifth lens 212 and the sixth lens 213 of the second lens group 20 is fixed by the corresponding spacing element 31. For easy discrimination during the assembling operation, the light shielding element 32 is attached to the top surface of the fourth lens 211 by coating. It is worth mentioning that the coating area and thickness of each of the light shielding elements 32 are adjustable according to design requirements. Comparing to the conventional techniques, the assembling operation of the present invention minimizes different assembling parts and enhancing the stability of the lens installation. During the assembling process of the first lens group 10, the first lens 111, the spacing element 31, the second lens 112, and the third lens 113 are sequentially mounted at the first lens barrel 12 to form the first lens group 10. During the assembling process of the second lens group 20, it is only necessary to sequentially mount the fourth lens 211, the fifth lens 212, the spacing element 31, and the sixth lens 213 to the second lens barrel 22 to form the second lens 20. Therefore, at least one spacer in the conventional art will be reduced during the installation, such as the installation of the spacer between the third lens 113 and the fourth lens 211. It can be understood that when the light shielding element 32 is attached to the surface of the lens, the light shielding element 32 can significantly simplify the installation complication of the lens group, reduce the separating distance between the lenses, and reduce the height of the lens group. Moreover, the reduction of assembling parts during installation is beneficial to minimize the tolerances and improve installation accuracy. Particularly, when the first lens group 10 and the second lens group 20 are assembled together, the spacing element 31 is not required between the third lens 113 and the fourth lens 211, such that the installation of the first lens group 10 and the second lens group 20 is simplified. Moreover, the light shielding element 32 coated by the fourth lens 211 can meet the requirement for the optical design, and the mass production efficiency of the split lens is greatly promoted.

Certainly, in other embodiments, the light shielding element 32 may be disposed on a bottom surface of the third lens 113 so as to form the predetermined light path between the first lens group 10 and the second lens group 20. It is worth mentioning that the spacing element 31 between the other lenses may also be replaced by the light shielding element 32.

According to the preferred embodiment of the present invention, the split lens further has a retention portion. Accordingly, the first lens barrel 12 has a first retention portion 120, and the second lens barrel 22 has a second retention portion 220. The first retention portion 120 and the second retention portion 220 are connected to each other, such that the first lens barrel 12 and the second lens barrel 22 are assembled to form an integrated one piece lens structure. The first retention portion 120 is implemented as a bottom end portion of the first lens barrel 12, and the second retention portion 220 is implemented as a top end portion of the second lens barrel 22. In one embodiment, as shown in FIG. 1, the first retention portion 120 is implemented as a bottom end portion of the first lens barrel 12 having an increased diameter thereat. Preferably, the optical axes of the lenses in the first lens barrel 12 and the second lens barrel 22 are uniform and coaxially aligned by the AA (Active Alignment) technique, thereby satisfying the optical design. In one embodiment, the first retention portion 120 further defines an inner retention surface 121 and an outer retention surface 122, and the second retention portion 220 further defines an outer retention surface 222, wherein the outer retention surface 122 is located at a lower edge of the first lens barrel 12. In other words, the outer retention surface 122 is located on the bottom surface of the first lens barrel 12, and the outer retention surface 222 of the second retention portion 220 is located at the upper edge of the second lens barrel 22. In other words, the outer retention surface 222 is located on the top surface of the second lens barrel 22. Thus, the outer retention surface 122 of the first retention portion 120 and the outer retention surface 222 of the second retention portion 220 can be connected by a connecting element 42. Therefore, the first lens group 10 and the second lens group 20 are connected and fixed together. The first inner retention surface 121 is configured to fix the third lens 113 to the first lens barrel 12. Preferably, the first retention portion 120 and the second retention portion 220 are connected together by using the connecting element 42 such as a UV thermosetting glue. The outer retention surface 122 of the first retention portion 120 and the outer retention surface 222 of the second retention portion 220 are correspondingly provided on the first lens barrel 12 and the second lens barrel 22 respectively. By alignedly assembling the outer retention surface 122 of the first retention portion 120 and the outer retention surface 222 of the second retention portion 220, the first lens barrel 12 and the second lens barrel 22 are accurately assembled in the exact position.

Figure 2:
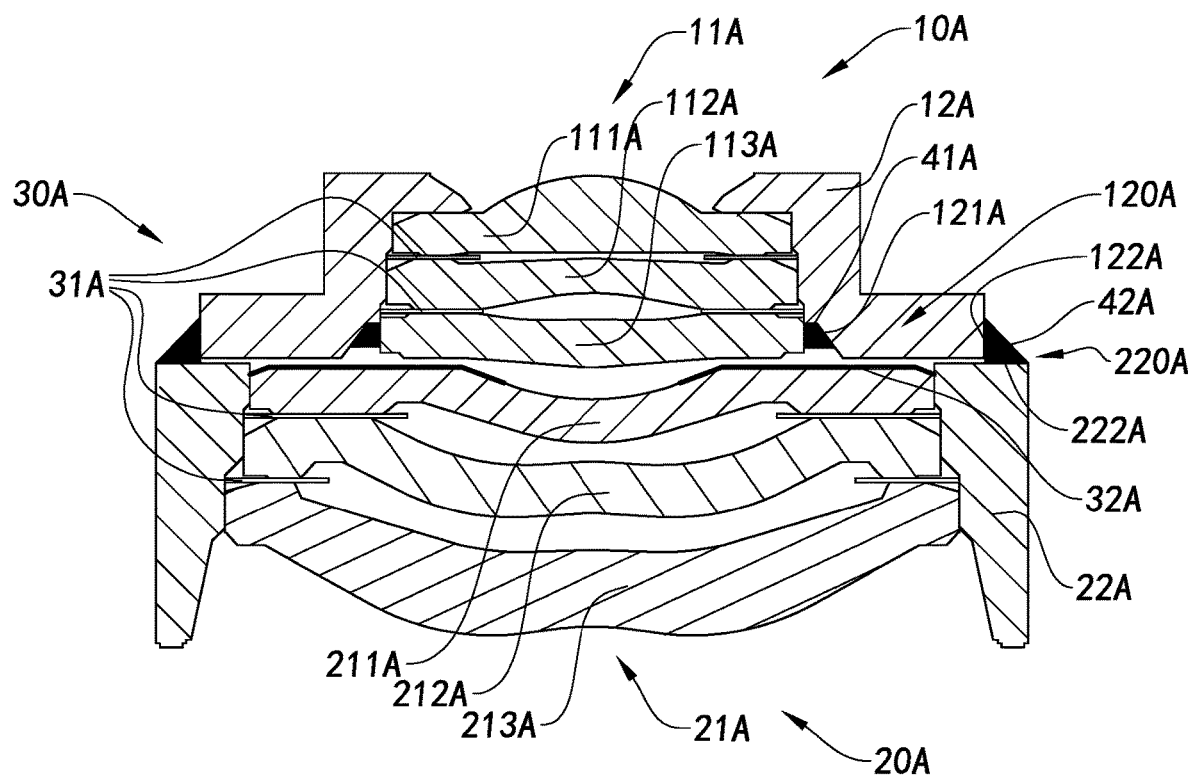
FIG. 2 is a sectional view of a split lens according to a second preferred embodiment of the present invention.

As shown in FIG. 2, according to a second preferred embodiment of the present invention, a split lens according to a second embodiment illustrates a modification of the first embodiment, wherein the split lens of the second embodiment has the similar structural configuration of the first embodiment. Accordingly, the first lens set 11A of the first lens group 10A comprises a first lens 111A, a second lens 112A and a third lens 113A. The second lens set 21A of the second lens group 20A comprises a fourth lens 211A, a fifth lens 212A and a sixth lens 213A. The first lens 111A, the second lens 112A and the third lens 113A are mounted in the first lens barrel 12A. The fourth lens 211A, the fifth lens 212A and the sixth lens 213A are mounted in the second lens barrel 22A.

According to the second preferred embodiment, the split lens comprises four spacing elements 31A. The light shielding element 32A is disposed on a top surface of the fourth lens 211A of the second lens group 20A. In other words, the four spacing elements 31A and one light shielding element 32A constitute the light shielding assembly 30A to collectively form a predetermined light path for the split lens. It is worth mentioning that each of the spacing elements 31A has an annular shape and is made of opaque material. In other words, the spacing elements 31A and the light shielding elements 32A of the light shielding assembly 30A are respectively placed at intervals of the lenses, thereby ensuring optical separation between the lenses, effective light aperture and consistency of the optical axis. One of the spacing elements 31A of the light shielding assembly 30A is disposed between the first lens 111A and the second lens 112A. One of the spacing elements 31A is disposed between the second lens 112A and the third lens 113A. One of the spacing elements 31A is disposed between the fourth lens 211A and the fifth lens 212A. One of the spacing elements 31A is disposed between the fifth lens 212A and the sixth lens 213A. The light shielding element 32A is disposed between the third lens 113A and the fourth lens 211A. Depending on the optical design of the lens configuration, the distance requirements between the lenses are different. In the second embodiment, the distance between the first lens 111A and the second lens 112A is separated by the corresponding spacing element 31A, wherein the distance between the first lens 111A and the second lens 112A is fixed. Similarly, the spacing between the other lenses are also ensured by the spacing elements 31A or the light shielding element 32A.

In the second preferred embodiment, the assembling relationship between the first lens group 10A and the second lens group 20A is configured by connecting the first outer retention surface 122A of the first lens barrel 12A with the second retention portion 222A of the second lens barrel 22A. Preferably, the first outer retention surface 122A is defined at an outer side of the bottom portion of the first lens barrel 12A, and the second outer retention surface 222A is defined at the top surface of the second lens barrel 11A. Therefore, the outer retention surface 122A of the first retention portion 120A and the outer retention surface 222A of the second retention portion 220A can be connected by the connecting element 42A in order to connect the first lens group 10A and the second lens group 20A with each other. In other words, the outer side surface of the first lens barrel 12A of the first lens group 10A and the top surface of the second lens barrel 22A of the second lens group 20A are mounted together by the connecting element 42A. The first inner retention surface 121A is configured to affix the third lens 113A to the first lens barrel 12A. Preferably, the connecting element 42A for connecting the first retention portion 120A and the second retention portion 220A is UV thermosetting glue. According to the second embodiment, the peripheral edge of the first lens barrel 11A is smaller than the second lens barrel 22A, such that the first outer retention surface 122A of the first lens barrel 12A and the second retention portions 222A of the second lens barrel 22A are stably connected.

Figure 4A:
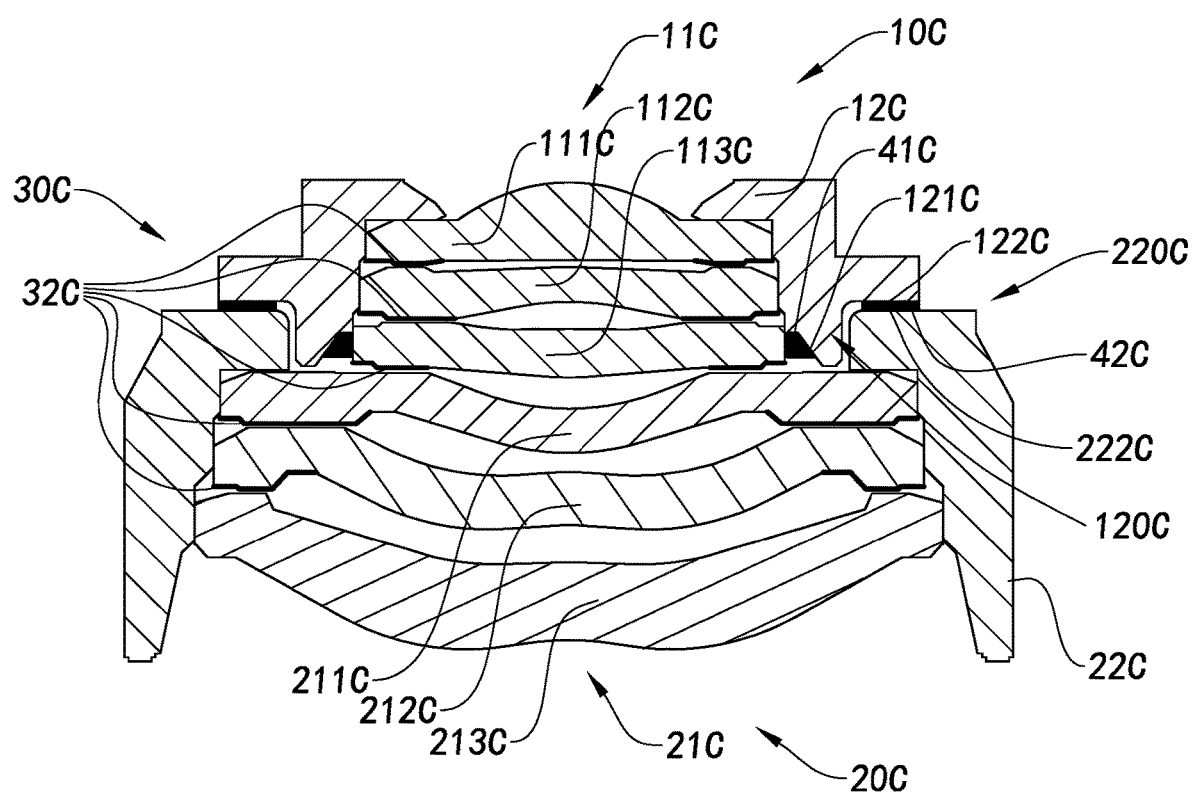
FIG. 4A is a sectional view of a split lens according to a fourth preferred embodiment of the present invention.

It is worth mentioning that when the light shielding element 32C is configured to dispose between two adjacent lenses, the light shielding element 32C can be attached at the bottom surface of the lens at the upper position, or at the top surface of the lens at the bottom position. For example, as shown in FIG. 4A, one of the light shielding elements 32C is configured to be disposed between the first lens 111C and the second lens 112C, wherein the light shielding element 32C can be attached to the bottom surface of the first lens 111C or attached to the top surface of the second lens 112C. One of the light shielding elements 32C is configured to dispose between the second lens 112C and the third lens 113C, wherein the light shielding element 32 can be attached to a bottom surface of the second lens 112C or attached to a top surface of the third lens 113C. One of the light shielding elements 32C is configured to dispose between the fourth lens 211C and the fifth lens 212C, wherein the light shielding element 32 can be attached to the bottom surface of the fourth lens 211C, or attached to the top surface of the fifth lens 212C. One of the light shielding elements 32C is configured to dispose between the fifth lens 212C and the sixth lens 213C, wherein the light shielding element 32 can be attached to a bottom surface of the fifth lens 212C or attached a top surface of the sixth lens 213C. As shown in FIG. 4A, the light shielding elements 32C are respectively disposed on the bottom surface of the first lens 111C, the bottom surface of the second lens 112C, the bottom surface of the third lens 113C, the bottom surface of the fourth lens 211C, and the bottom surface and the bottom surface of the fifth lens 212C as an example. It should not be limited in the present invention and the shielding elements 32C can be attached to different surfaces of the lens with different combinations.

Figure 3:
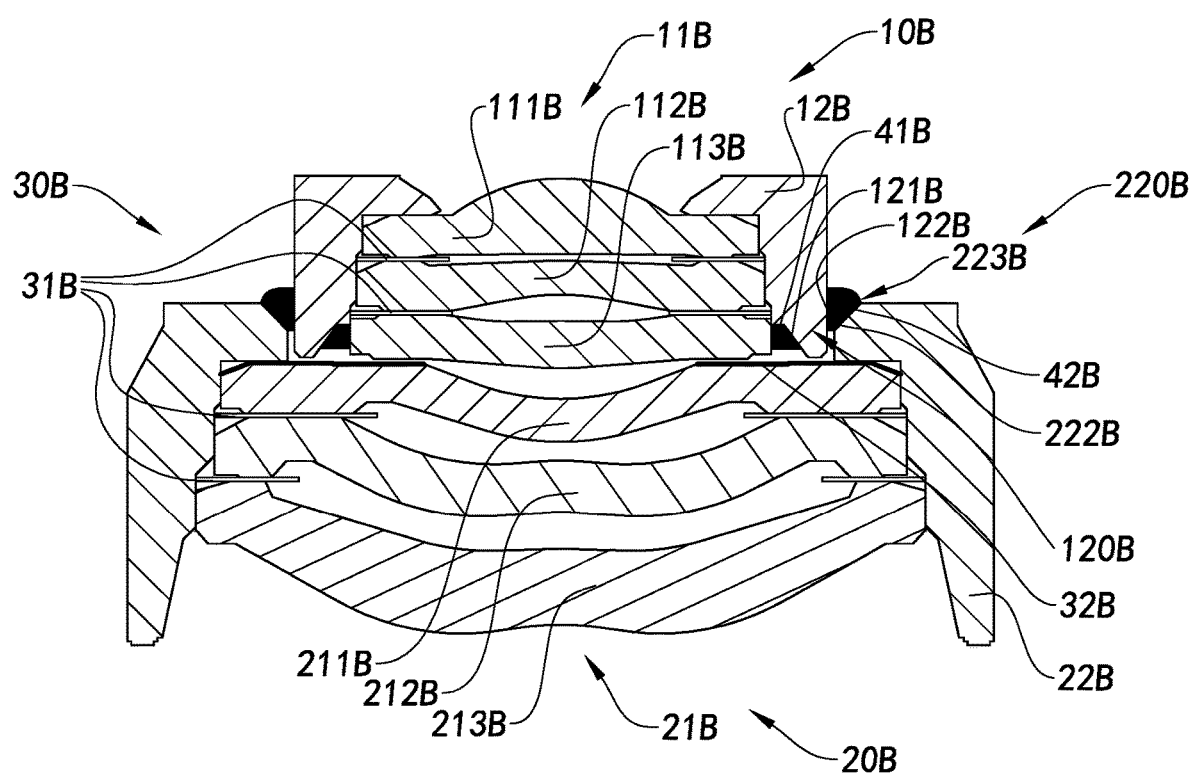
FIG. 3 is a sectional view of a split lens according to a third preferred embodiment of the present invention.

FIG. 3 illustrates a split lens according to a third preferred embodiment of the present invention similar to that of the first preferred embodiment. In other words, the first lens set 11B of the first lens group 10B comprises a first lens 111B, a second lens 112B, and a third lens 113B. The second lens set 21B of the second lens group 20B comprises a fourth lens 211B, a fifth lens 212B, and a sixth lens 213B. The first lens 111B, the second lens 112B, and the third lens 113B are mounted in the first lens barrel 12B. The fourth lens 211B, the fifth lens 212B, and the sixth lens 213B are mounted in the second lens barrel 22B.

According to the third preferred embodiment, the light shielding assembly 30B preferably comprises four spacing elements 31B and a light shielding element 32B. It is worth mentioning that each of the spacing elements 31B has an annular shape and is made of opaque material. The light shielding element 32B is applied to the surface of the lens, such as by coating, wherein since the light shielding element 32B is made of opaque material, the light shielding element 32B will block the light from passing through the surface portion of the lens covered by the light shielding element 32B. In other words, the spacing elements 31B and the light shielding element 32B of the light shielding assembly 30B are respectively placed at intervals of the lenses to ensure optical spacing between the lenses, effective apertures, and optical axis uniformity. One of the spacing elements 31B is disposed between the first lens 111B and the second lens 112B. One of the spacing elements 31B is disposed between the second lens 112B and the third lens 113. The light shielding element 32B is disposed between the third lens 113 and the fourth lens 211B. One of the spacing elements 31B is disposed between the fourth lens 211B and the fifth lens 212B. One of the spacing elements 31B is disposed between the fifth lens 212B and the sixth lenses 213B. According to the optical design of the lens configuration, the distance requirements between the lenses can be different.

It is worth mentioning that the light shielding element 32B is coated on the top surface of the fourth lens 211B. The coating area and thickness of the light shielding element 32B can be processed and configured according to the lens design requirements. Comparing to the conventional techniques, the present invention minimizes the assembling part between two lens groups. When assembling the first lens group 10B, the first lens 111B, one of the spacing elements 31B, the second lens 112B, another spacing element 31B, and the third lens 113B are sequentially mounted to the first lens barrel 12B. When assembling the second lens group 10B, the fourth lens 211B, one of the spacing elements 31B, the fifth lens 212B, another spacing element 31B, and the sixth lens 213B are sequentially mounted in the second lens barrel 22B. It can be seen that the installation of the spacer in the conventional technology is reduced. Furthermore, the use of the light shielding element 32B can significantly reduce the assembling difficulty of the lens group. The light shielding element 32B can be disposed on the top or bottom surface of the lens as desired for different optical designs. Accordingly, when the first lens group 10B and the second lens group 20B are assembled together, there is no need to consider other factors between the third lens 113B and the fourth lens 211B, such that the installation difficulty between the first lens group 10B and the second lens group 20B will be reduced. Moreover, the light shielding element 32B having an annular shape is coated on the fourth lens 211B to ensure the conditions required for optical design.

According to the third embodiment, preferably, the connection between the lens barrels is permanently coupled with each other to form the split lens. The outer retention surface 122B is defined at an outer side of the bottom portion of the first lens barrel 12B, and the outer retention surface 222B of the second retention portion 220B is defined at an inner side of the top portion of the second lens barrel 22B. The second lens barrel 22B further has a retention groove 223B formed at an inner side thereof. Particularly, the retention groove 223B is formed at a top portion of the second lens barrel 22B, wherein the retention groove 223B is formed with an annular shape. In other words, the retention groove 223B is formed at an inner opening rim of the second lens barrel 22B. The retention groove 223B has an inner diameter gradually increased from the second lens group 20B toward the first lens group 10B. The diameter size of the retention groove 223B is configured corresponding to the first outer retention surface 122B of the first lens barrel 12B, such that the first lens barrel 12B fits in the second lens barrel 22B to contact the first outer retention surface 122B of the first barrel 12B with the retention groove 223B while the connecting element 42B fills at the gap within the retention groove 223B to mount the first outer retention surface 122B of the first barrel 12B. Accordingly, the outer retention surface 122B of the first retention portion 120B and the outer retention surface 222B of the second retention portion 220B can be connected by the connecting element 42B in order to connect the first lens group 10B and the second lens group 20B with each other. Moreover, the formation of the retention groove 223B can prevent excessive connecting element 42B, such as liquid glue, from being excessively applied to enter into the interior of the second lens barrel 22B. The formation of the retention groove 223B will provide a positioning alignment to reduce the assembling time to mount the first outer retention surface 122B at the second lens barrel 22B, and to ensure an accuracy assembling position of the second lens group 20B to the first group 10B. In other words, the first lens barrel 12B has a reduced bottom end diameter to fit at the top end of the second lens barrel 22B, such that by applying the glue via active calibration process, no light can enter into the split lens through the side thereof.

It is worth mentioning that if the light shielding element 32B is replaced by the conventional spacer, the diameter of the spacer is generally smaller than the diameter of the second lens barrel 22B, wherein the spacer is retained and sandwiched between two adjacent lenses. When it cannot be clamped between two adjacent two lenses, it is necessary to clamp and fix between the fourth lens 211B and the inner side of the outer retention surface 222B of the second retention portion 220B of the second lens barrel 22B, so as to fit between two adjacent lenses. Since the outer retention surface 222B can only provide a relatively small clamping and bearing area, the spacer cannot be stably fixed. Thus, the spacer is easy to be deformed. Therefore, when the second lens group 20B is assembled in an upside down position, the spacer is easily deformed. When any external force is applied to the spacer, such as during the cleaning process, the spacer is easy to fall off. According to the present invention, the light shielding element 32B is attached to the top surface of the fourth lens 222B, such that the outer retention surface 222B is not required to provide the mounting abutment surface, and is more suitable for being altered and configured in the structure of the split lens.

Preferably, through the active calibration technique, the lenses in the first lens barrel 12B and the second lens barrel 22B are ensured to have a uniform optical axes are uniform to enhance the optical design. When the first lens group 10B and the second lens group 20B are assembled together, the outer retention surface 122B of the first retention portion 120B and the outer retention surface 222B of the second retention portion 220B are directly assembled correspondingly. The first lens barrel 12B and the second lens barrel 22B can be accurately assembled in an exact position with each other and affixed by a glue connection in the retention groove 223B.

FIG. 4 illustrates a split lens according to a fourth preferred embodiment of the present invention, wherein the split lens of the fourth embodiment is constructed to have two lens groups as an example. The first lens set 11C of the first lens group 10C comprises a first lens 111C, a second lens 112C, and a third lens 113C. The second lens set 21C of the second lens group 20C comprises a fourth lens 211C, a fifth lens 212C and a sixth lens 213C. The first lens 111C, the second lens 112C and the third lens 113C are mounted in the first lens barrel 12C. The fourth lens 211C, the fifth lens 212C and the sixth lens 213C are mounted in the second lens barrel 22C.

According to the fourth embodiment, the light shielding assembly 30C comprises five shielding elements 32A. It is worth mentioning that the light shielding elements 32C are coated on the bottom surfaces of the lenses, wherein each of the light shielding elements 32C is made of an opaque material to prevent light from passing through the surface portion of the lens covered by the light shielding element 32C. In other words, the light shielding elements 32C are respectively disposed at intervals of the lenses for ensuring an optical separation between the lenses, effective light aperture and consistency of the optical axis. Accordingly, the first light shielding element 32C is disposed between the first lens 111C and the second lens 112C. The second light shielding element 32C is disposed between the second lens 112C and the third lens 113C. The third light shielding element 32C is disposed between the third lens 113C and the fourth lens 211C. The fourth light shielding element 32C is disposed between the fourth lens 211C and the fifth lens 212C. The fifth light shielding element 32C is disposed between the fifth lens 212C and the sixth lens 213C. Therefore, when the lenses are mounted to the lens barrels, the mounting direction can be directly guided and determined based on the positions of the light shielding elements 32C. Moreover, the light shielding element 32C fulfills the requirement of the light passing aperture between the lenses according to the optical design of the lens structure.

Accordingly, the coating area and thickness of each of the light shielding elements 32C are adjustable according to design requirements. Comparing to the conventional techniques, the assembling operation of the two lens groups minimizes any assembling part therebetween. When the first lens group 10C is assembled, the first lens 111C, the second lens 112C, and the third lens 113C are configured to be sequentially mounted to the first lens barrel 12C. When the second lens group 20C is assembled, the fourth lens 211C, the fifth lens 212C, and the sixth lens 213C are configured to be sequentially mounted to the second lens barrel 22C. The installation of the spacer in the conventional technology is omitted. It can be seen that the use of the light shielding element 32C can significantly simplify the mounting process and reduce the mounting difficulty of the lens groups. Moreover, the amount of the light shielding element 32C applied to the bottom surface of the lens is less than the amount of the light shielding element 32C applied to the top surface of the lens. However, the light shielding effect of the light shielding element 32C is the same between the top and bottom surfaces of the lens. Thus, when the first lens group 10C and the second lens group 20C are assembled together, there is no need to consider other factors between the lenses, such that the installation between the first lens group 10C and the second lens group 20C is easier. Moreover, the light shielding element 32C coated at the third lens 113C can fulfill the conditional requirement for the optical design, and the production difficulty level and cost will effectively reduce.

According to the fourth embodiment, the assembling relationship between the first lens group 10C and the second lens group 20C is configured by connecting the outer retention surface 122C of the first lens barrel 12C and the outer retention surface 222C of the second lens barrel 22C. It is worth mentioning that the outer retention surface 122C is extended at an outer surface of the first lens barrel 12C to form a protrusion at a bottom lateral side of the retention portion 120C of the first lens barrel 12C corresponding to the second outer retention surface 222C. In the fourth embodiment, the first retention portion 120C is not extended at the bottom end portion of the first lens barrel 12C but is protruded from the outer side of the first lens barrel 12C.

Preferably, the outer retention surface 122C is configured to protrude on the first retention portion 120C of the first lens barrel 12C, wherein the outer retention surface 222C is configured at the top surface of the second lens barrel 11C, such that the first lens barrel 12C is supported by the second outer retention surface 222C. Accordingly, the outer retention surface 122C of the first retention portion 120C and the outer retention surface 222C of the second retention portion 220C are connected by the connecting element 42C in order to connect the first lens group 10C and the second lens group 20C with each other. Accordingly, the first inner retention surface 121C is configured to affix the third lens 113C to the first lens barrel 12C. In the fourth embodiment, the periphery of the first lens barrel 11C is smaller than the periphery of the second lens barrel 22C, such that the first outer retention surface 122C of the first lens barrel 12C is stably supported by the second retention portion 220C of the second lens barrel 22C. The first outer retention surface 122C of the first lens barrel 12C is configured to shorten the width of the first lens barrel 12C as a whole comparing to the first preferred embodiment.

Figure 4B:
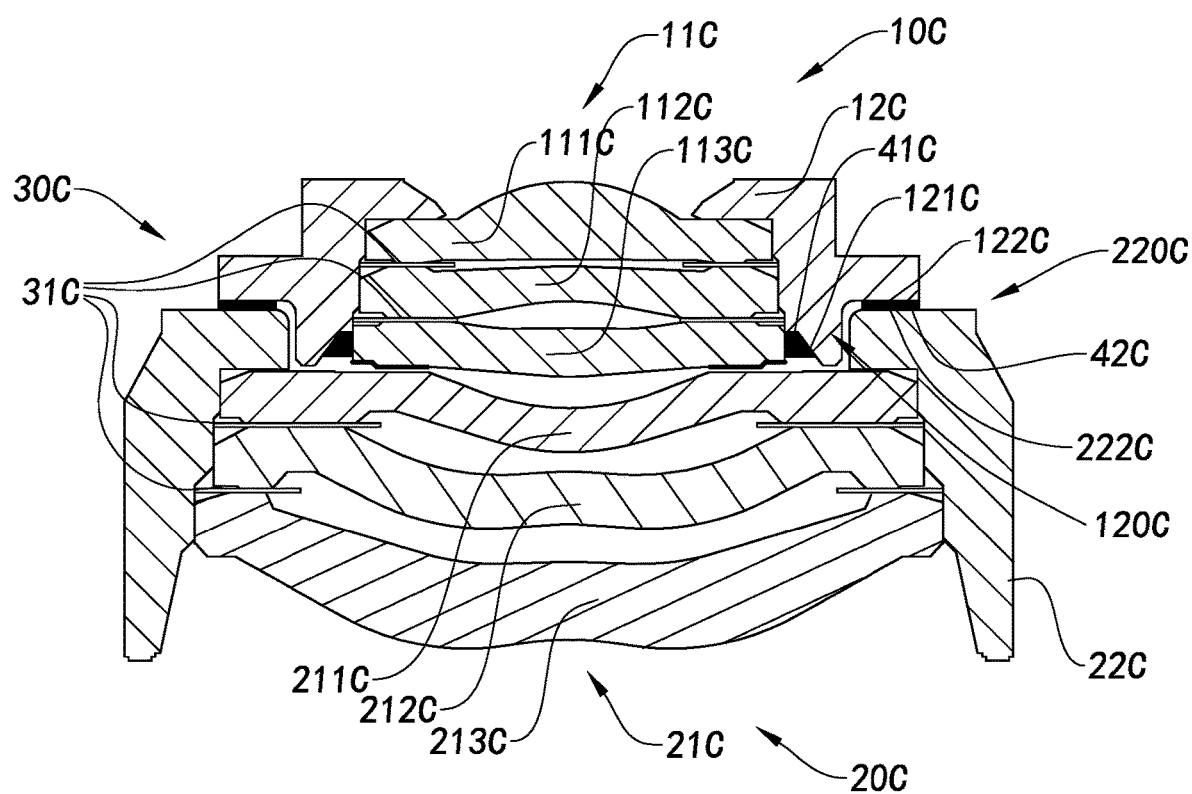
FIG. 4B illustrates an alternative mode of the split lens according to the above fourth preferred embodiment of the present invention.

FIG. 4B illustrates an alternative mode of the split lens according to the fourth preferred embodiment. In this alternative mode, the light shielding element 32C is disposed on the bottom surface of the third lens 113C, while the spacing elements 31C are disposed at other positions, such as between the first lens 111C and the second lens 112C, between the second lens 112C and the third lens 113C, between the fourth lens 211C and the fifth lens 212C, and between the fifth lens 212C and the sixth lens 213C.

Figure 5:
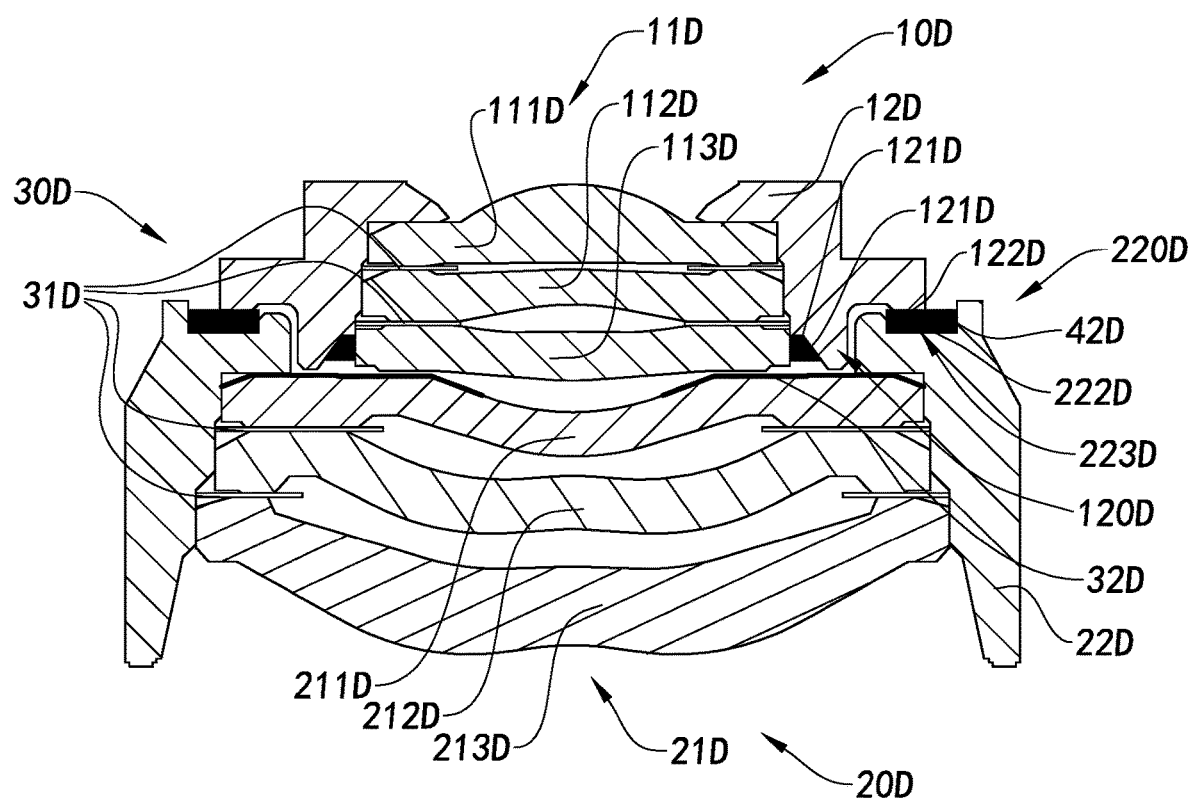
FIG. 5 is a sectional view of a split lens according to a fifth preferred embodiment of the present invention.
Figure 6:
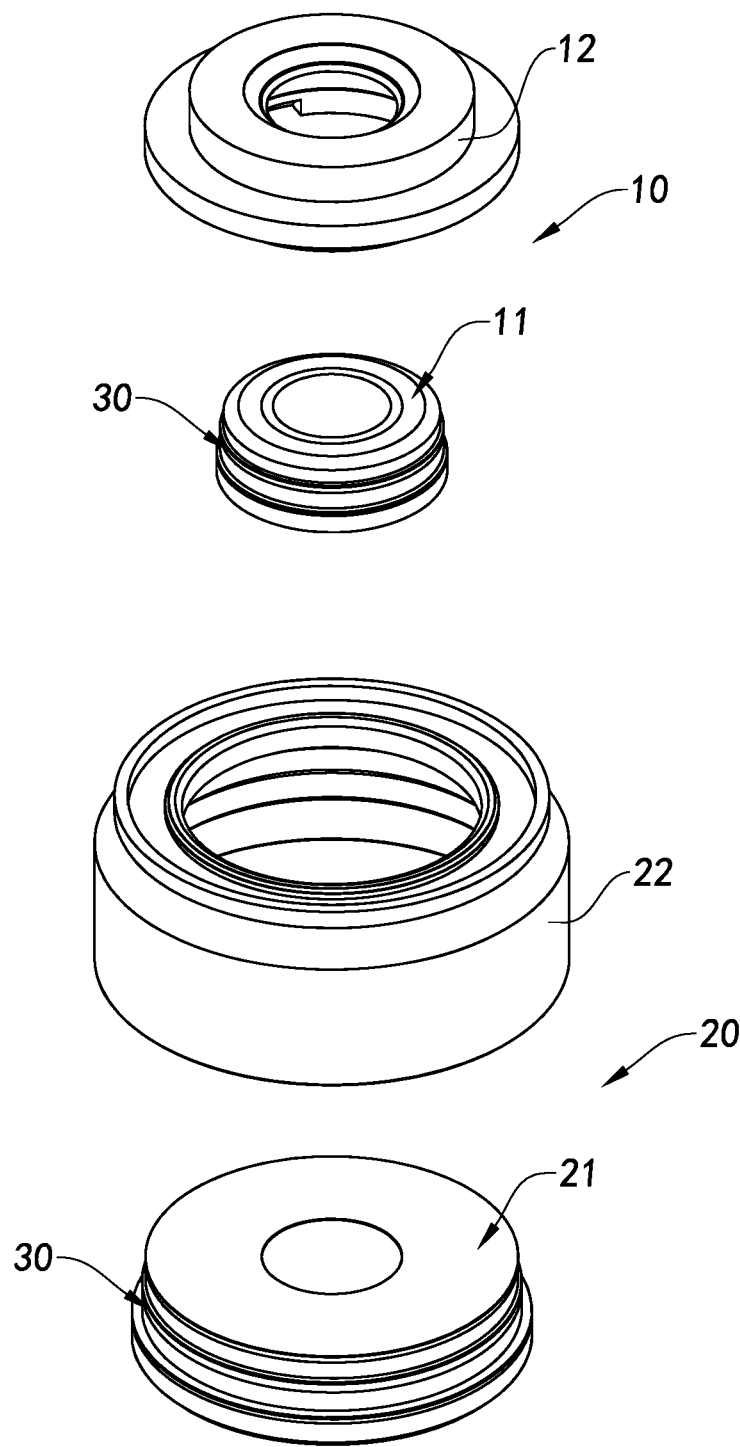
FIG. 6 is an exploded perspective view of the split lens according to the above fifth preferred embodiment of the present invention.

As shown in FIGS. 5 and 6, a split lens of a fifth embodiment illustrates another modification of the first embodiment. The first lens set 11D of the first lens group 10D comprises a first lens 111D, a second lens 112D, and a third lens 113D. The second lens set 21D of the second lens group 20D comprises a fourth lens 211D, a fifth lens 212D and a sixth lens 213D. Accordingly, it should be understood that the number of lenses in the first lens group 11D and the second lens group 21D should not limit in the present invention, and the number of lenses can be varied according to the requirements of different camera modules. For easy understanding, the first lens 111D, the second lens 112D, and the third lens 113D are mounted in the first lens barrel 12D, while the fourth lens 211D, the fifth lens 212D and the sixth lens 213D are mounted in the second barrel 22D.

In addition, the light shielding assembly 30D further comprises at least one spacing structure. In the fifth embodiment, the spacing structure preferably comprises four spacing elements 31D and one light shielding element 32D. It is worth mentioning that each of the spacing elements 31D has an annular shape and is made of opaque material. The light shielding element 32D, having an annular shape and is made of opaque material, is coated on the surface of the lens to prevent light from passing through the surface portion of the lens covered by the light shielding element 32D. In other words, the spacing elements 31D and the light shielding element 32D of the light shielding assembly 30D are respectively disposed at intervals of the lenses for ensuring optical separation between the lenses, effective light aperture and consistency of the optical axis. Accordingly, one of spacing elements 31D is disposed between the first lens 111D and the second lens 112D. One of spacing elements 31D is disposed between the second lens 112D and the third lens 11D3. The light shielding element 32D is disposed between the third lens 113D and the fourth lens 211D. One of spacing elements 31D is disposed between the fourth lens 211D and the fifth lens 212D. One of spacing elements 31D is disposed between the fifth lens 212D and the sixth lens 213D. Depending on the optical design and configuration of the lens, the distance between the lenses has different requirements. According to the fifth embodiment, the distance between the first lens 111D and the second lens 112D is separated by the spacing element 31D, wherein the distance between the first lens 111D and the second lens 112D can be effectively fixed. Likewise, the spacing elements 31D further retain and ensure the distance between the second lens 112D and the third lens 113D of the first lens group 10D, the distance between the fourth lens 211D and the fifth lens 212D of the second lens group 20D, and the distance between the fifth lens 212D and the sixth lens 213D. For easy discrimination during the assembling operation, the light shielding element 32D is attached to the top surface of the fourth lens 211D by coating. It is worth mentioning that the coating area and thickness of each of the light shielding elements 32D are adjustable according to design requirements. Comparing to the conventional techniques, the assembling operation of the present invention minimizes different assembling parts. During the assembling process of the first lens group 10D, the first lens 111D, the spacing element 31D, the second lens 112D, another spacing element 31D, and the third lens 113D are sequentially mounted at the first lens barrel 12D to form the first lens group 10D. During the assembling process of the second lens group 20D, it is only necessary to sequentially mount the fourth lens 211D, the spacing element 31D, the fifth lens 212D, another spacing element 31D, and the sixth lens 213D to the second lens barrel 22D to form the second lens 20D. Therefore, the spacer in the conventional art will be reduced during the installation. It can be understood that when the light shielding element 32D is attached to the surface of the lens, the light shielding element 32D can significantly simplify the installation complication of the lens group, reduce the separating distance between the lenses, and reduce the height of the lens group. Moreover, the reduction of assembling parts during installation will beneficial to minimize the tolerances and improve installation accuracy. Particularly, when the first lens group 10D and the second lens group 20D are assembled together, no component such spacer or the spacing element 31, is required between the third lens 113D and the fourth lens 211D, such that the installation of the first lens group 10D and the second lens group 20D will be simplified. Moreover, the light shielding element 32D coated by the fourth lens 211D can meet the requirement for the optical design, and the mass production efficiency of the split lens is greatly promoted.

Furthermore, the split lens further comprises a retention portion. Accordingly, the first lens barrel 12D has a first retention portion 120D, and the second lens barrel 22D has a second retention portion 220D. The first retention portion 120D and the second retention portion 220D are connected to each other, such that the first lens barrel 12D and the second lens barrel 22D are assembled to form an integrated one-piece lens structure. Preferably, the optical axes of the lenses in the first lens barrel 12D and the second lens barrel 22D are uniform and coaxially aligned by the AA (Active Alignment) technique, thereby satisfying the optical design. In the fifth embodiment, the first retention portion 120D further defines an inner retention surface 121D and an outer retention surface 122D. The second retention portion 220D further defines an outer retention surface 222D and a retention groove 223D. The first inner retention surface 121D is configured to affix the third lens 113D to the first lens barrel 12D. It is worth mentioning that the first retention portion 120D is extended from an outer surface the first lens barrel 12D to protrude from the bottom side thereof, wherein the first retention portion 120D is protruded from the first lens barrel 12D to receive at the retention groove 223D of the second lens barrel 22D. According to the fifth embodiment, the assembling relationship between the first lens group 10D and the second lens group 20D is configured by connecting the first outer retention surface 122D of the first lens barrel 12D with the second retention portion 222D of the second lens barrel 22D. Preferably, the first outer retention surface 122D is defined at an outer side of the first lens barrel 12D and protruded from the bottom portion thereof, and the retention groove 223D is defined at the top surface of the second lens barrel 11A, so as to affix the first lens barrel 12D at the second outer retention surface 222D. Accordingly, the outer retention surface 122D of the first retention portion 120D and the outer retention surface 222D of the second retention portion 220D can be connected by the connecting element 42D in order to connect the first lens group 10D and the second lens group 20D with each other. Particularly, the first retention portion 122D is securely affixed in the retention groove 223D by using a connecting glue, in order to directly affix the outer retention surface 122D of the first retention portion 120D to the retention groove 223D of the second retention portion 220D. Therefore, the first lens barrel 12D and the second lens barrel 22D can be accurately assembled in an exact position with each other. Preferably, the connecting element 42D for connecting the first retention portion 120D and the second retention portion 220D is UV thermosetting glue.

Therefore, the outer retention surface 122D of the first retention portion 120D and the retention groove 223D of the second retention portion 220D are connected by the connecting element 42D so as to connect the first lens group 10D and the second lens group 20D together. Accordingly, the first inner fixing surface 121D is configured to affix the third lens 113D at the first lens barrel 12D. In the fifth embodiment, the periphery of the first lens barrel 11D is smaller than the periphery of the second lens barrel 22D, such that the first outer retention surface 122D of the first barrel 12D is stably supported by the second retention portion 222D of the retention lens barrel 22D. The first outer retention surface 122D of the first lens barrel 12D is configured to shorten the width of the first lens barrel 12D as a whole comparing to the first preferred embodiment. Moreover, the retention groove 223D can prevent excessive connection element 42D, such as liquid glue, from entering the interior of the first barrel 12D and the second barrel 22D. The formation of the retention groove 223D will provide a positioning alignment to reduce the assembling time to mount the first outer retention surface 122D at the second lens barrel 22D, and to ensure an accuracy assembling position of the second lens group 20D to the first group 10D.

As shown in FIG. 6, during the assembling operation, the first lens 111D, the spacing element 31D, the second lens 112D, another spacing element 31D, and the third lens 113D are firstly mounted to the first lens barrel 12D. When assembling the second lens group 20D, the fourth lens 211D, the spacing element 31D, the fifth lens 212D, another spacing element 31D, and the sixth lens 213D are sequentially mounted to the second lens barrel 22D. When assembling the first lens group 10D with the second lens group 20D, the first retention portion 122D is affixed at the retention groove 223D by applying the connecting element 42D thereat. Therefore, the outer retention surface 122D of the first retention portion 120D can be directly engaged with the retention groove 223D of the second retention portion 220D, such that the first lens barrel 12D and the second lens barrel 22D can be accurately assembled in an exact position with each other. Then, the first lens group 10D and the second lens group 20D can be finally assembled after the active calibration.

Figure 7:
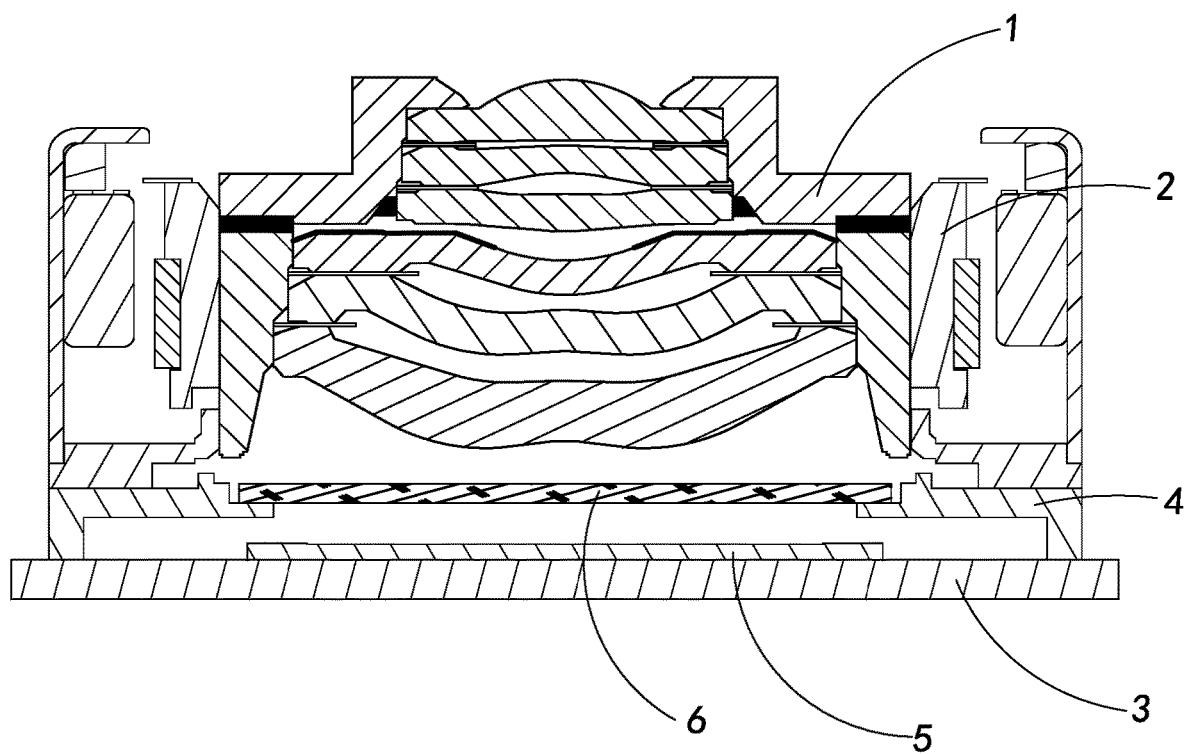
FIG. 7 is a sectional view of a camera module incorporating with the split lens of the above embodiments of the present invention.

FIG. 7 illustrates a camera module incorporating with the split lens, wherein the camera module is an auto focus camera module as an example. The camera module comprises the split lens 1, a driver 2, a circuit board 3, a base unit 4, and a photosensitive unit 5, wherein the split lens 1 is mounted to the driver 2 for providing an autofocus feature. The driver 2 and the photosensitive unit 5 are electrically connected to the circuit board 3 respectively. The base unit 4 is configured for supporting the driver 2 and accommodating the photosensitive unit 5. Accordingly, an image is formed via a photoelectric conversion when light passes through the split lens 1 to the photosensitive unit 5. Correspondingly, a filter 6, such as an infrared filter or a blue glass filter, can be disposed between the split lens 1 and the photosensitive unit 5 for filtering the light before entering to the photosensitive unit 5.

During the assembling process, in addition to the first lens group of the split lens 1, other components of the camera module are assembled. Then, through the active calibration process, the installation position of the first lens group can be accurately determined and fixed to form the camera module. Particularly, the photosensitive unit 5 is electrically connected to the circuit board 3. The base unit 4 is mounted or integrally formed on the circuit board 3. The driver 2 is mounted to the base unit 4 and is electrically connected to the circuit board 3. Accordingly, the second lens group of the split lens 1 is mounted to the driver 2, and then the first lens group is pre-assembled with the second lens group. Through the active calibration process, the imaging quality is analyzed to determine possible errors such as offset or tilt position of the first lens group. Thus, once the position of the first lens group is controllably adjusted to obtain a desired imaging quality of the camera module, the first lens group and the second lens group are assembled together.

Through the active calibration process, the connecting element may be applied to complete the pre-assembling of the first lens group and the second lens group. After the position of the first lens group is determined and set, the connecting element is completely cured, such as solidified, to complete the connection between the first lens group and the second lens group. Alternatively, after determining the position of the first lens group, the connecting element is applied and fully cured, such that the first lens group and the second lens group are formed to be an integrated one piece lens structure.

Figure 8:
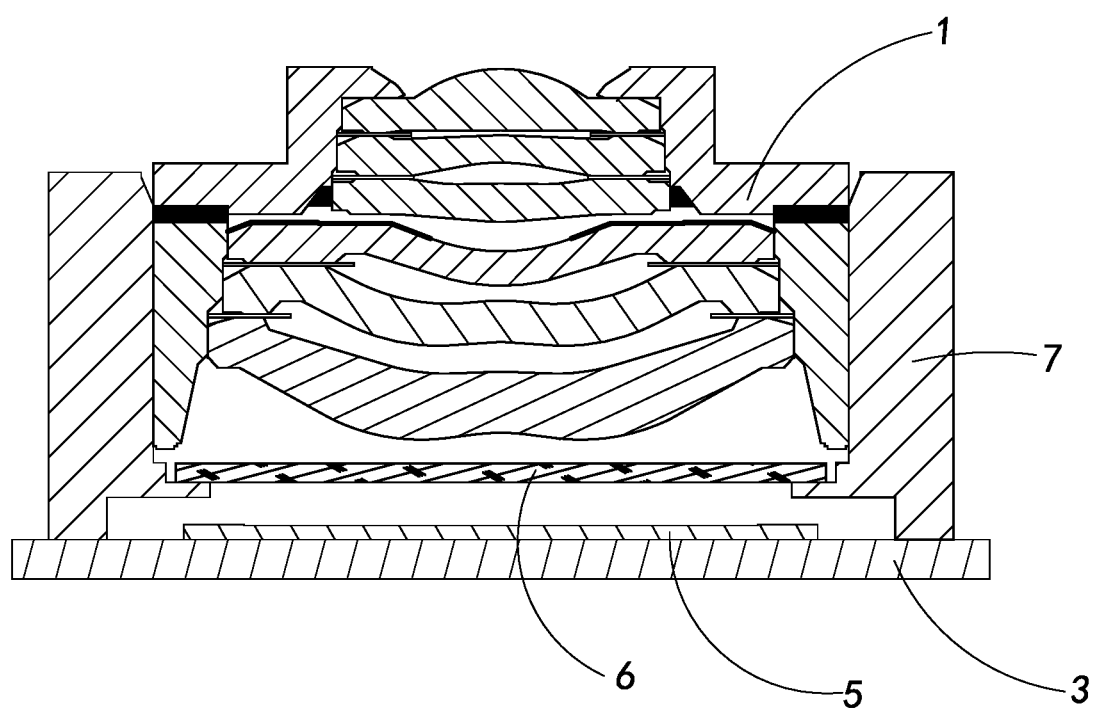
FIG. 8 is a sectional view of another camera module incorporating with the split lens of the above embodiments of the present invention.

FIG. 8 illustrates another type of camera module incorporating with the split lens, wherein the camera module is a fixed focus camera module as an example. The camera module comprises the split lens 1, a circuit board 3, a light reflective mount 6, and a photosensitive unit 5. The split lens 1 is mounted to the light reflective mount 6 having a mirror surface. The photosensitive unit 5 is electrically connected to the circuit board 3. The light reflective mount 6 is configured for supporting the split lens 1 and accommodating the photosensitive unit 5. Accordingly, an image is formed via a photoelectric conversion when light passes through the split lens 1 to the photosensitive unit 5. Correspondingly, a filter 6, such as an infrared filter or a blue glass filter, can be disposed between the split lens 1 and the photosensitive unit 5 for filtering the light before entering to the photosensitive unit 5. Similarly, the first lens group of the split lens 1 can be assembled with the second lens group by the active calibration process to form an integral lens structure so as to form the camera module.

Figure 9:
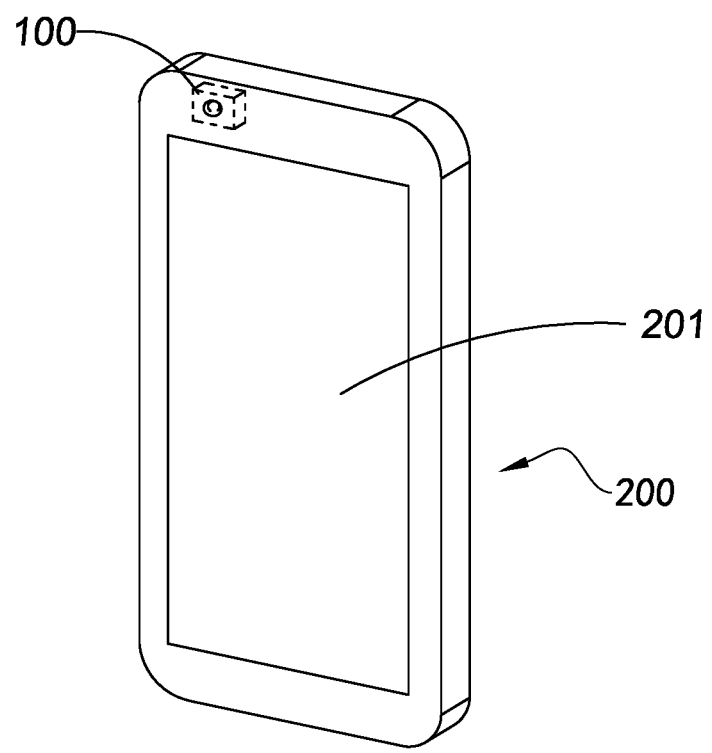
FIG. 9 illustrates an electronic apparatus incorporating with the camera module.

As shown in FIG. 9, the camera module 100 can be applied to an electronic apparatus 200, such as not limited to a smart phone, a wearable device, a computer device, a television, a vehicle, a camera, a monitoring device, and the like. The electronic apparatus 200 comprises an electronic device body 201. The camera module 100 is mounted on the electronic device body 201 and connected to the control board thereof, wherein the camera module 100 cooperates with the electronic device body 201 to complete image collection and reproduction.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A split lens, comprising:
   at least a first lens group comprising at least a first lens set and a first lens barrel, wherein said first lens set is mounted in said first lens barrel;
   at least a second lens group comprising at least a second lens set and a second lens barrel, wherein said second lens set is mounted in said second lens barrel; and
   at least a light shielding element disposed between said first lens set and said second lens set to form a predetermined light path between said first lens group and said second lens group when said first lens group and said second lens group are stably assembled together;
   wherein at least one of said light shielding elements is attached to a top surface of the lens at an upper position of said second lens group or a bottom surface of the lens at a bottom position of said first lens group.

2. The split lens, as recited in claim 1, wherein said second lens set comprises two or more lens, wherein one of said light shielding elements is attached to the top surface of said lens at the upper position of said second lens set.

3. The split lens, as recited in claim 1, wherein said first lens set comprises two or more lens, wherein one of said light shielding elements is attached to a top surface of said lens at the bottom position of said first lens set.

4. The split lens, as recited in claim 1, wherein said first lens set comprises two or more lens, wherein said second lens set comprises two or more lens, wherein said light shielding elements are attached at bottom surfaces of said lens in said first lens set and top surfaces of said lens in said second lens set respectively.

5. The split lens, as recited in claim 1, wherein at least one of said light shielding elements is disposed between two adjacent lenses which are located at said first lens group and said second lens group respectively.

6. The split lens, as recited in claim 5, wherein said two adjacent lenses are configured as an upper lens and a bottom lens respectively, wherein said light shielding element is attached to the bottom surface of said upper lens.

7. The split lens, as recited in claim 5, wherein said two adjacent lenses are configured as an upper lens and a bottom lens respectively, wherein said light shielding element is attached to the top surface of said bottom lens.

8. The split lens, as recited in claim 1, further comprising at least one spacing element disposed between two lenses of at least one of said first lens set and said second lens set.

9. The split lens, as recited in claim 1, wherein said first lens barrel further comprises a first retention portion formed at a bottom end portion of said first lens barrel, and said second lens barrel further comprises a second retention portion formed at a top end portion of said second lens barrel, wherein said first retention portion and said second retention portion are connected with each other, such that said first lens barrel and said second lens barrel are assembled to form an integrated lens configuration.

10. The split lens, as recited in claim 9, wherein a diameter of said bottom end portion of said first lens barrel is smaller than a diameter of said top end portion of said second lens barrel, such that said first retention portion of said first lens barrel is configured to fit into said second retention portion of said second lens barrel so as to stably couple said first lens barrel with said second lens barrel.

11. The split lens, as recited in claim 9, further comprising a connecting element, wherein said first retention portion of said first lens barrel is adhered with said second retention portion of said second lens barrel by said connecting element.

12. The split lens, as recited in claim 9, further comprising a connecting element, wherein said second lens barrel further has a retention groove formed at a top side of said second lens barrel corresponding to said first retention portion of said first lens barrel, wherein said connecting element is filled in said retention groove to couple said first retention portion and said second retention portion with each other.

13. The split lens, as recited in claim 9, wherein said first retention portion is protruded from an outer lateral side of said first lens barrel, wherein said first retention portion and said second retention portion are connected with each other at a position that said bottom end portion of said first lens barrel is extended into said second retention portion for connecting said first lens barrel and said second lens barrel with each other.

14. The split lens, as recited in claim 1, wherein said light shielding element is a coating layer coated on a lens of one of said first lens set and said second lens set.

15. The split lens, as recited in claim 1, wherein said light shielding element is a black rubber layer coated on a lens of one of said first lens set and said second lens set.

16. The split lens, as recited in claim 1, wherein said light shielding element has an annular shape and is made of opaque material applied on a surface portion of a lens of one of said first lens set and said second lens set for blocking light from passing through said surface portion of said lens covered by said light shielding element.

17. The split lens, as recited in claim 16, wherein said light shielding element is applied at a peripheral edge portion of said lens, such that said light path is formed at a center portion of said lens.

18. A method of manufacturing a split lens, comprising the steps of:
(a) forming at least a first lens group by mounting at least a first lens set in a first lens barrel;
(b) forming at least a second group by mounting at least a second lens set in a second lens barrel;
(c) disposing at least a light shielding element between said first lens set and said second lens set to form a predetermined light path between said first lens group and said second lens group, wherein at least one of said light shielding elements is attached to a top surface of the lens at an upper position of said second lens group or a bottom surface of the lens at a bottom position of said first lens group; and
(d) assembling said first lens group and said second lens group together.

19. The method as recited in claim 18 wherein, in the step (c), said light shielding element is attached to the bottom surface of a lens of said first lens set.

20. The method as recited in claim 18 wherein, in the step (c), said light shielding element is attached to the top surface of a lens of said second lens set.

21. The method as recited in claim 18 wherein, in the step (c), said light shielding element is disposed between two adjacent lenses which are located at said first lens group and said second lens group respectively.

22. The method, as recited in claim 18, further comprising a step of disposing at least one spacing element between two lenses of at least one of said first lens set and said second lens set.

23. The method as recited in claim 18 wherein, in the steps (a) and (b), said first lens barrel further comprises a first retention portion formed at a bottom end portion of said first lens barrel, and said second lens barrel further comprises a second retention portion formed at a top end portion of said second lens barrel, wherein, in the step (c), said first retention portion and said second retention portion are connected with each other, such that said first lens barrel and said second lens barrel are assembled to form an integrated lens configuration.

24. The method, as recited in claim 23, wherein the step (c) further comprises a step of applying a connecting element to adhere said first retention portion of said first lens barrel with said second retention portion of said second lens barrel.

25. The method, as recited in claim 18, wherein said light shielding element is coated on a lens of one of said first lens set and said second lens set.

26. The method, as recited in claim 18, wherein said light shielding element has an annular shape and is made of opaque material applied on a surface portion of a lens of one of said first lens set and said second lens set for blocking light from passing through said surface portion of said lens covered by said light shielding element.

27. The method, as recited in claim 26, wherein said light shielding element is applied at a peripheral edge portion of said lens, such that said light path is formed at a center portion of said lens.

* * * * *